Figure 1:
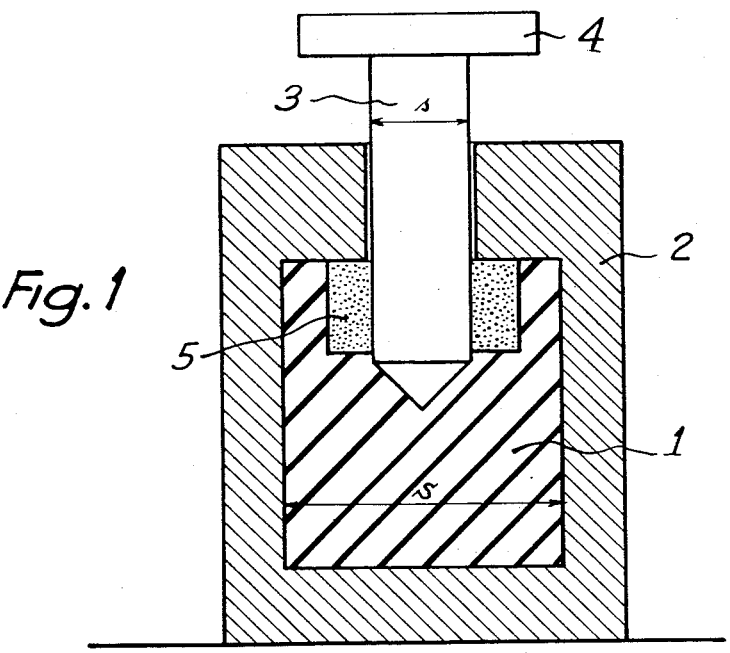

Aug. 1, 1961   J. JARRET ET AL   2,994,524
MEANS FOR STORING MECHANICAL ENERGY
Filed July 6, 1959

United States Patent Office 2,994,524
Patented Aug. 1, 1961

2,994,524
MEANS FOR STORING MECHANICAL ENERGY
Jean Jarret, 18 Rue du Mont-Valerien, Saint-Cloud, France, and Jacques Jarret, 18 Ave. Gallieni, Le Vesinet, France
Filed July 6, 1959, Ser. No. 825,059
Claims priority, application France July 9, 1958
3 Claims. (Cl. 267—1)

This invention relates to means for storing mechanical energy by the hydrostatic compression of an elastomeric body, whereby the stored energy can later be given up and made available for use. Such action is made practically possible owing to the relatively high compressibility of elastomers. Thus, elastomers may have compressibility values of from 0.00002 to 0.00006 per kg./cm.$^2$; provided sufficiently high hydrostatic pressures are used, say in a range of from 400 to 4000 kg./cm.$^2$, the resulting volume variations in the elastomer will be large enough to provide mechanical energy storage devices, i.e. spring, having practically usable geometric dimensions and possessing advantageous characteristics useful e.g. for damping and similar purposes.

In U.S.A. Patent No. 2,800,321 of July 23, 1957, the applicants have described a mechanical energy storage device or spring system based on the principle just described and essentially comprising a body of elastomer entirely enclosed in a deformable sealed casing capable, under the action of a linear compression force, of assuming a non-permanent linear deformation, whereby the internal capacity of the enclosure or casing is correspondingly decreased and hence the volume of the elastomer body is reduced.

It is an object of the present invention to provide a new and improved embodiment of such an energy-storage or spring device.

In accordance with this invention, the sealed enclosure is provided by a rigid, rather than a deformable, casing, and is formed with an opening through which a piston-like member or plunger is slidable, whereby the reduction in internal capacity of the enclosure is provided by an inward displacement of said plunger into the casing under the action of a compressive force applied to an outer end of the plunger.

In order to avoid the possibility of the plunger being jammed by engagement of a portion of the elastomer between the plunger and the walls of the opening in the casing, part of the body of the elastomer near the plunger and around the opening may desirably be replaced with a solid pulverulent material, so that particles of this material will engage the interstices between the relatively sliding surfaces of the plunger and casing, while the body of elastomer will at all times be maintained at a sufficient distance from such interstices to avert the aforesaid danger of insertion into the interstices and consequent jamming of the plunger.

The particulate or pulverulent material used is preferably in the nature of a solid lubricant to minimize friction and further reduce the danger of jamming and seizing. Graphite, and molybdenum disulfide, are examples of suitable materials for this purpose.

To minimize loss of this solid lubricant through leakage during operation of the device, a seal may further be provided adapted to deform under the pressure of the elastomer and thereby to become applied against one or both of the relatively slidable surfaces and prevent outward leakage of the solid lubricant. Such a seal may be so dimensioned that the friction of it against the relatively slidable surface will simultaneously serve to damp the movements of the spring device.

In a modification of the invention, the solid lubricant may be directly mixed into the elastomer body.

Figure 2:
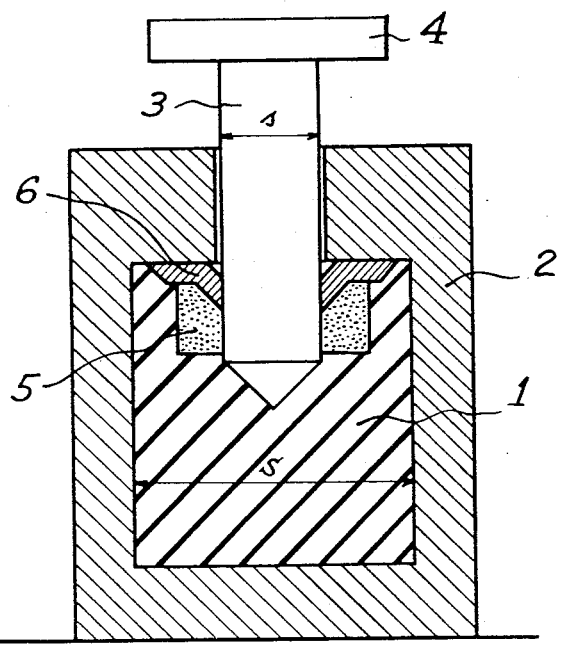

Embodiments of the invention will now be particularly described by way of illustration but not of limitation with reference to the accompanying diagrammatic drawings, wherein FIGS. 1 and 2 are sectional views of the two respective embodiments.

In FIG. 1, a body of vulcanized elastomer is enclosed in a rigid metallic casing 2 having an opening formed through one end wall of it and a plunger 3 is slidable in said opening so as to vary the effective internal capacity in the casing that is available to the body of elastomer. With the elastomer completely filling the enclosure 1, the plunger 3 by sinking more less deeply into the casing under the action of a compressive force applied to an outer pressure plate 4 secured to the outer end of the plunger, which force will generally constitute a variable pressure or impact that is to be damped by the device of the invention, will result in varying the volume of the elastomer and the degree to which it is compressed. The cross sectional area $s$ of the plunger 3 should be substantially smaller than the average cross sectional area $S$ of the body of elastomer in the casing 2, so as to permit a comparatively long displacement stroke of the plunger in spite of the small total volume variation in the elastomer under compression, and also to produce a non uniform compression in the elastomer for damping the plunger movements. The ratio between the section areas $S$ and $s$ should preferably be selected within a range of from about 3:1 to about 30:1.

With the device as so far described there is the possibility that the elastomer will tend to flow in the form of a thin film into the interstice between the plunger and the sides of the opening in the casing 2 and that the pinching of this film in the interstice will jam further movement of the piston and render the device inoperative. To avert such a condition, in a preferred form of the invention, the body of elastomer does not fill the enclosure completely, and an e.g. cylindrical cavity is reserved around the plunger 3, during vulcanization of the elastomer. Such cavity is filled with an annular pulverulent solid lubricant 5, e.g. molybdenum disulfide, which thus constitutes a ring surrounding the piston and having a side positioned against the annular interstice between the relatively sliding surface portions of the casing and plunger. This ring of lubricant is subjected to the pressure from the compressed elastomer and prevents the insertion of elastomer into the interstice. It is also found satisfactory in some cases to mix the solid lubricant directly with the body of elastomer.

The resulting spring devices that can be produced in this way are relatively small in size, and the elastomer pressure can be made to attain values as high as 3000 kg./cm.$^2$ and more since the metal casing can readily be made strong enough to withstand such pressures. Under pressures of the value just mentioned, one cubic decimeter of elastomer can be made to store, and later give up, about 1,500 kilogrammeters work or energy. Further, the metal casing very slightly and resiliently expanding and contracting under the variations in internal pressure, will act as an additional and highly effective means of storing mechanical energy adding its action to the primary energy-storing action of the elastomer body.

In the device described, a considerable degree of damping is inherently achieved by the action of viscous friction resulting from the non-uniform deformation of the elastomer by the piston in view of the difference in cross section between them, as previously mentioned.

In the modified construction shown in FIG. 2, a metal seal 6 is interposed between the mass of solid lubricant 5 and the wall of the casing 2 in which the opening is formed. The seal 6 may be bonded with the said casing wall and will tend to become strongly applied against the surfaces of the plunger to oppose any leakage of solid lubricant material 5 out of the casing. Further, the sliding seal in this construction can be made to exert sufficient friction to convert a high proportion of the mechanical energy received by the device into heat or, in other words, increase the damping effect if this is desired.

Self-damping spring assemblies of the kind provided by this invention are susceptible of a variety of applications, e.g. as impact-absorbing buffer or bumper systems, as well as in the suspension of vehicles.

It will be understood that various departures may be made from the constructions shown. Thus, the casing 2 is not necessarily made of metal, but may be made from other substantially rigid materials having a lower elasticity modulus than metallic materials, for example reinforced plastics and the like.

What we claim is:

1. A spring device of the type described, which comprises a rigid casing, a body of elastomer confined in the casing, a plunger member movably projecting into said body of elastomer through an apertured wall of the casing to vary the effective inner capacity of said casing available to the elastomer on application of a force to said plunger member externally of the casing, and an annular body of pulverulent material interposed within the casing between the body of elastomer and the adjacent surfaces of said plunger member and said apertured casing wall.

2. A device according to claim 1, wherein said pulverulent material comprises a solid lubricant.

3. A device according to claim 1, which includes a resilient seal member surrounding the plunger member between said body of pulverulent material and said relatively movable surfaces, so as to tend to be applied against the plunger member under the pressure of the body of elastomer and prevent egress of the pulverulent material through the space between said member and the wall of the casing aperture.

References Cited in the file of this patent

UNITED STATES PATENTS

| | | |
|---|---|---|
| 1,555,214 | Johnson | Sept. 29, 1925 |
| 2,668,049 | Taylor | Feb. 2, 1954 |
| 2,686,155 | Willis | Aug. 10, 1954 |
| 2,778,426 | Taylor | Jan. 22, 1957 |
| 2,846,211 | Taylor | Aug. 5, 1958 |

FOREIGN PATENTS

| | | |
|---|---|---|
| 695,195 | Great Britain | Aug. 5, 1953 |